(12) United States Patent
Terai et al.

(10) Patent No.: US 7,845,713 B2
(45) Date of Patent: Dec. 7, 2010

(54) PILLAR STRUCTURE OF AUTOMOBILE

(75) Inventors: Hideaki Terai, Kariya (JP); Yukio Matsuda, Okazaki (JP)

(73) Assignees: Kabushiki Kaisha Toyota Jidoshokki, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 54 days.

(21) Appl. No.: 12/518,814

(22) PCT Filed: Jun. 20, 2008

(86) PCT No.: PCT/JP2008/061678

§ 371 (c)(1), (2), (4) Date: Jun. 11, 2009

(87) PCT Pub. No.: WO2009/001910

PCT Pub. Date: Dec. 31, 2008

(65) Prior Publication Data

US 2010/0060037 A1    Mar. 11, 2010

(30) Foreign Application Priority Data

Jun. 22, 2007    (JP) .............................. 2007-165242

(51) Int. Cl.
*B60N 99/00* (2006.01)
(52) U.S. Cl. ............................................... 296/193.06
(58) Field of Classification Search ............ 296/187.12, 296/193.05, 193.06, 201, 203.03
See application file for complete search history.

(56) References Cited

U.S. PATENT DOCUMENTS

| | | | |
|---|---|---|---|
| 5,772,277 A | 6/1998 | Fukuda | |
| 5,887,393 A | 3/1999 | Vanark et al. | |
| 6,485,089 B2 * | 11/2002 | Hanyu | 296/193.05 |
| 6,824,201 B2 * | 11/2004 | Miyazaki | 296/193.06 |

(Continued)

FOREIGN PATENT DOCUMENTS

JP    56-87370 U    7/1981

(Continued)

OTHER PUBLICATIONS

Communication pursuant to Article 94(3) EPC for Application No. 08 777 643.1-1268, dated Apr. 13, 2010.

(Continued)

*Primary Examiner*—Lori L Lyjak
(74) *Attorney, Agent, or Firm*—Locke Lord Bissell & Liddell LLP

(57) ABSTRACT

The pillar structure includes a pillar (11), a front outer garnish (21), a triangular window (30), and a shielding portion (22). The pillar includes an outer panel (13) and an inner panel (14). A flange portion (136) of the outer panel and a flange portion (146) of the inner panel are joined to each other so as to form a joint portion (17). The front outer garnish is attached to the pillar so as to cover the outer panel. The triangular window is supported by the pillar. The shielding portion shields the joint portion, thereby making invisible the joint portion from the outside of the vehicle through the triangular window. The outer garnish and the triangular window are integrally molded, and the shielding portion is integrated with the front outer garnish. The joint portion is bent toward the inner panel or the outer panel.

6 Claims, 2 Drawing Sheets

Figure 1:
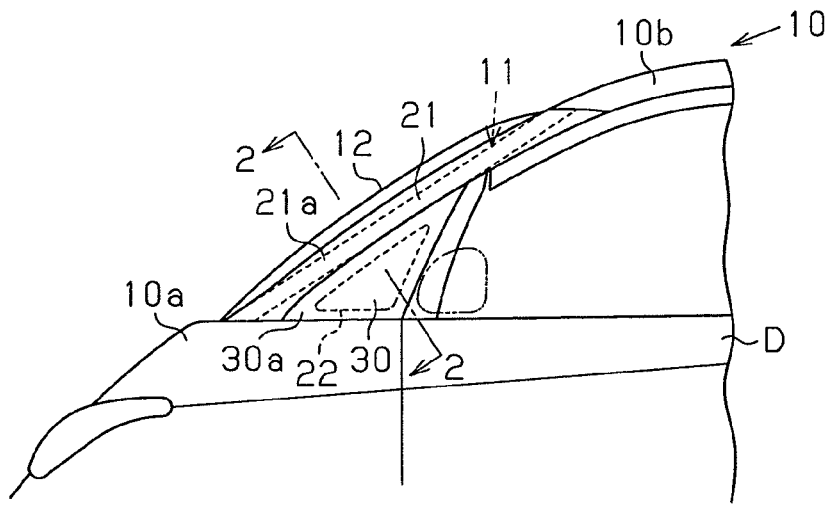

U.S. PATENT DOCUMENTS 6,824,204 B2 * 11/2004 Gabbianelli et al. .... 296/193.06
7,195,308 B1 * 3/2007 Mendis et al. ......... 296/193.06
7,488,022 B2 * 2/2009 Belwafa et al. ........ 296/193.06

FOREIGN PATENT DOCUMENTS

JP 02-040674 A 2/1990
JP 2-40674 U 3/1990

OTHER PUBLICATIONS

International Search Report issued on Oct. 7, 2008, for International Application No. PCT/JP2008/061678.

* cited by examiner

PILLAR STRUCTURE OF AUTOMOBILE

FIELD OF THE INVENTION

The present invention relates to a pillar structure of an automobile.

BACKGROUND OF THE INVENTION

For example, Japanese Laid-Open Utility Model Publication No. 56-87370 discloses a pillar structure of an automobile. As shown in FIG. 4, a front pillar 90 includes an outer pillar member 91 and an inner pillar member 92, which are joined to each other. The outer pillar member 91 has an adhesion surface 91*a*, a front flange 91*b*, and a rear flange 91*c*. The adhesion surface 91*a* is substantially parallel to a windshield 93, and the rear flange 91*c* is substantially parallel to a front door (not shown). Also, the inner pillar member 92 has a front flange 92*a*, which is substantially parallel to the windshield 93, and a rear flange 92*b*, which is substantially parallel to the front door.

The front flanges 91*b*, 92*a* are joined to each other so as to form a front joint portion 94, and the rear flanges 91*c*, 92*b* are joined to each other so as to form a rear joint portion 95. A peripheral area of the windshield 93 is adhered to the adhesion surface 91*a* of the outer pillar member 91 by means of an adhesion member 98, so that the windshield 93 is supported by the front pillar 90.

The inner pillar member 92 supports a pillar trim 96. The pillar trim 96 has a first end portion 96*a*, which is bent to encompass the front joint portion 94, and a second end portion 96*b*, which is bent to encompass the rear joint portion 95. Also, the outer pillar member 91 supports a molding 97, which covers a section of the windshield 93 outside of the adhesion member 98. Further, an opaque portion 93*a* is proved on the back surface of the windshield 93. The opaque portion 93*a* makes invisible a part including the peripheral edge of the windshield 93 and the first end portion 96*a* of the pillar trim 96 from the outside of the vehicle.

In the above publication, the first end portion 96*a* of the pillar trim 96 is bent to encompass the front joint portion 94. Therefore, the distance from the peripheral edge to the first end portion 96*a* of the pillar trim 96 is short compared to that in a case where the first end portion 96*a* of the pillar trim 96 is not bent. In this manner, the opaque portion 93*a* is reduced, so that the effective view of an occupant through the windshield 93 is enlarged.

Some cars have a triangular window (window transparent portions), for example, in a front portion of each side. The triangular window is, for example, adhered to the rear joint portion of the front pillar by adhesive. Thus, to make invisible the rear joint portion, to which the triangular window is adhered, from the outside, the triangular window has an opaque portion that shields the rear joint portion. Thus, there is a demand for a pillar structure that reduces the size of such an opaque portion of the triangular window, thereby enlarging the effective view of an occupant through the triangular window.

SUMMARY OF THE INVENTION

Accordingly, it is an objective of the present invention to provide a pillar structure of an automobile that ensures a large effective view through a window transparent portion.

To achieve the foregoing objective and in accordance with one aspect of the present invention, a pillar structure of a vehicle is provided. The pillar structure includes a pillar, a cover member, a window transparent portion, and a shielding portion. The pillar has an outer panel located on a vehicle outer side and an inner panel located on a vehicle inner side. The outer panel and the inner panel each have a flange portion. The flange portion of the outer panel and the flange portion of the inner panel are joined to each other so as to form a joint portion. The cover member is attached to the pillar so as to cover the outer panel from the vehicle outer side. The window transparent portion is supported by the pillar. The shielding portion shields the joint portion from the vehicle outer side, thereby making invisible the joint portion from the outside of the vehicle through the window transparent portion. The cover member and the window transparent portion are integrally molded of a synthetic resin material, and the shielding portion is integrated with the cover member. The joint portion is bent toward the inner panel or the outer panel.

BRIEF DESCRIPTION OF THE DRAWINGS

FIG. 1 is a side view illustrating a front portion of an automobile according to one embodiment of the present invention;

FIG. 2 is a cross-sectional view taken along line 2-2 of FIG. 1;

FIG. 3 is a side view illustrating a pillar structure in a rear portion of a vehicle; and FIG. 4 is a cross-sectional view showing a prior art.

DETAILED DESCRIPTION OF THE PREFERRED EMBODIMENTS

A pillar structure according to one embodiment of the present invention will now be described with reference to FIGS. 1 and 2. The pillar structure is provided in a front portion of a side of an automobile 10.

As shown in FIG. 1, in the pillar structure of the automobile 10, a pair of front pillars 11 (only one front pillar 11 is shown in FIG. 1) are provided on both side of a vehicle body 10*a* in a direction along the width. The front pillars 11 support side edge areas of a windshield 12. A roof 10*b* and the front pillars 11 are formed as separate members. On the vehicle outer side of each front pillar 11, a front outer garnish 21 is provided to function as a cover member to cover the front pillar 11. Also, the front outer garnish 21 has a triangular window (front corner window) 30 integrated with the front outer garnish 21. The triangular window 30 is located in a front portion of a side of the vehicle body 10*a*. Specifically, the triangular window 30 is located between the front pillar 11 and a front door D.

The front pillar 11 will now be described. As shown in FIG. 2, the front pillar 11 includes an outer panel 13 arranged on the vehicle outer side, an inner panel 14 arranged on the vehicle inner side, and a pillar reinforcement 15 provided between the outer panel 13 and the inner panel 14. The inner panel 14, the outer panel 13, and the reinforcement 15 are formed of metal plates.

The outer panel 13 has a first flange portion 13*a* in a first end portion (front end portion). The first flange portion 13*a* is arranged to be parallel to and face the windshield 12. Also, the outer panel 13 has a second flange portion 13*b* in a second end portion (rear end portion). The second flange portion 13*b* is bent in relation to the outer panel 13 such that the distal end of the second flange portion 13*b* is close to the front outer garnish 21. The second flange portion 13*b* extends to be nonparallel to the front outer garnish 21.

A bulging portion 13*c* is provided between the first flange portion 13*a* and, the second flange portion 13*b*. The bulging portion 13*c* is bent so as to include a first section, a second section and a third section. The first section extends from the first flange portion 13a toward the vehicle outer side, that is, toward the front outer garnish 21. The second section extends from the first section to be substantially parallel to the front outer garnish 21. The third section extends from the second section toward the vehicle inner side, that is, toward the inner panel 14. The second flange portion 13b is bent to be substantially orthogonal to the third section of the bulging portion 13c. The bulging portion 13c has a fitting hole 13d.

The inner panel 14 has a first flange portion 14a in a first end portion (front end portion). The first flange portion 14a is arranged to be parallel to and face the windshield 12. Also, the inner panel 14 has a second flange portion 14b in a second end portion (rear end portion). The second flange portion 14b is bent in relation to the inner panel 14 and extends so as to be nonparallel to the front outer garnish 21, such that the distal end of the second flange portion 14b is close to the front outer garnish 21.

A bulging portion 14c is provided between the first flange portion 14a and the second flange portion 14b. The bulging portion 14c is bent so as to include a first section and a second section. The first section extends from the first flange portion 14a to the vehicle inner side. The second section extends from the first section toward the vehicle outer side, that is, toward the front outer garnish 21.

The reinforcement 15 has a first flange portion 15a in a first end portion (front end portion). The first flange portion 15a is arranged to be parallel to and face the windshield 12. Also, the reinforcement 15 has a second flange portion 15b in a second end portion (rear end portion). The second flange portion 15b is bent in relation to the reinforcement 15 and extends so as to be nonparallel to the front outer garnish 21, such that the distal end of the second flange portion 15b is close to the front outer garnish 21. The reinforcement 15 includes a flat plate-like reinforcing portion 15c that extends between the first flange portion 15a and the second flange portion 15b.

The first flange portion 15a of the reinforcement 15 has a first face (front surface) to which the first flange portion 13a of the outer panel 13 is joined (welded) and a second face (back surface) to which the first flange portion 14a of the inner panel 14 is joined (welded). The joined three flange portions 13a, 14a, 15a form a first joint portion 16, which is located at a first end portion (front end portion) in the direction along the width of the front pillar 11. The first joint portion 16 extends parallel to the windshield 12.

The second flange portion 15b of the reinforcement 15 has a first face (front surface) to which the second flange portion 13b of the outer panel 13 is joined (welded) and a second face (back surface) to which the second flange portion 14b of the inner panel 14 is joined (welded). The joined three flange portions 13b, 14b, 15b form a second joint portion 17, which is located at a second end portion (rear end portion) in the direction along the width of the front pillar 11. The second joint portion 17 extends to be nonparallel to the front outer garnish 21. Specifically, the second joint portion 17 is bent toward the outer panel 13 such that the distal end of the second joint portion 17 is close to the front outer garnish. 21.

Through the joining procedure described above, the outer panel 13, the inner panel 14, and the reinforcement 15 are integrated to form the front pillar 11. The first flange portion 13a of the outer panel 13 and the first flange portion 14a of the inner panel 14 are used as joint margins to which the first joint portion 16 is joined when manufacturing the front pillar 11. The second flange portion 13b of the outer panel 13 and the second flange portion 14b of the inner panel 14 are used as joint margins to which the second joint portion 17 is joined when manufacturing the front pillar 11. Since the front pillar 11 has the bulging portions 13c, 14c, which are bent into predetermined shapes, and the reinforcement 15, the front pillar 11 has a required strength.

The front pillar 11 is covered with a front inner garnish 18 from the vehicle inner side, and is thus not exposed to the inside of the vehicle. A side edge portion of the windshield 12 is adhered to the first flange portion 13a by means of a urethane adhesive 33.

Next, the front outer garnish 21 and the triangular window 30 will be described. The front outer garnish 21 and the triangular window 30 is made of polycarbonate, which is a synthetic resin material, and the front outer garnish 21 and the triangular window 30 are integrally molded by two-color molding. That is, the triangular window 30 is joined to and integrated with the front outer garnish 21. A front face 21a of the front outer garnish 21 that is exposed to the outside of the vehicle and a front face 30a of the triangular window 30 that is exposed to the outside of the vehicle are flush with each other. No boundary (gap) exists between the front outer garnish 21 and the triangular window 30. The front outer garnish 21 is colored black, and the triangular window 30 is transparent.

The front outer garnish 21 is integrated with a black frame 22, which extends along the peripheral area, or three edges (see FIG. 1). The triangular window 30 is integrated with (joined to) the front outer garnish 21 so as to be supported by the front face (a vehicle outer side) of the black frame 22. Thus, when the triangular window 30 is viewed from the outside of the vehicle, the black frame 22 is seen through the triangular window 30 as shown in FIG. 1.

Figure 2:
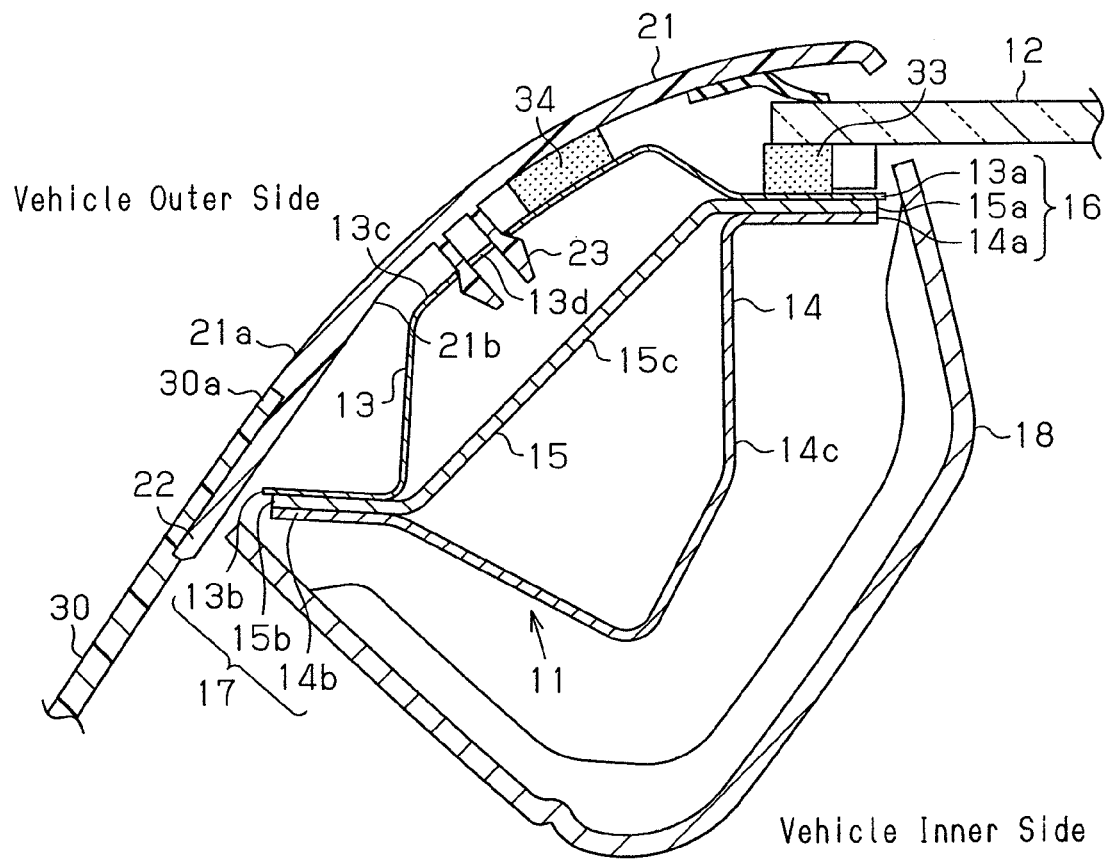

As shown in FIG. 2, an engaging projection 23 is provided on a back face 21b of the front outer garnish 21. The fitting projection 23 is located in a position that faces the front pillar 11. The projection 23 is fitted in the hole 13d formed in the outer panel 13. The back face 21b of the front outer garnish 21 is adhered (joined) to the bulging portion 13c of the outer panel 13 by means of a urethane adhesive 34, so that the front outer garnish 21 is attached to the front pillar 11. Also, since the front outer garnish 21 is attached to the front pillar 11, the triangular window 30, to which the front outer garnish 21 is integrated, is supported by the front pillar 11. When the front outer garnish 21 is adhered, the fitting projection 23 is fitted in the fitting hole 13d, the front outer garnish 21 is temporarily fixed to the front pillar 11.

With the front outer garnish 21 attached to the front pillar 11 and the triangular window 30 supported by the front pillar 11, the second joint portion 17 of the front pillar 11 is arranged on a back face (the vehicle inner side) of the black frame 22, while being bent toward the outer panel 13. Thus, the second joint portion 17 is shielded by the black frame 22 from the vehicle outer side. That is, the second joint portion 17 cannot be seen from the outside of the vehicle. Therefore, in the pillar structure of the present embodiment, the black frame 22 forms a shielding portion that shields the second joint portion 17.

The pillar structure of the present embodiment has the front pillar 11 having the first and second joint portions 16, 17, and the front outer garnish 21 attached to the front pillar 11. Further, the pillar structure has the black frame 22, which shields the second joint portion 17 such that the second joint portion 17 cannot be seen from the outside of the vehicle through the triangular window 30 supported by the front pillar 11. The side edge area of the windshield 12 is covered by the side edge area of the front outer garnish 21. This makes the first joint portion 16 invisible from the outside of the vehicle.

The above described embodiment has the following advantages.

(1) The front outer garnish 21 and the triangular window 30 are integrally molded of polycarbonate. Therefore, the triangular window 30 is joined to the front outer garnish 21 and is supported by the front pillar 11 with the front outer garnish 21 in between. The second joint portion 17 of the front pillar 11 is bent to be nonparallel to the triangular window 30 and toward the outer panel 13. Thus, compared to a case where the second joint portion 17 is arranged to be parallel to the triangular window 30 so that the triangular window 30 is joined to the second joint portion 17, the width of the second joint portion 17 along a direction parallel to the triangular window 30 is reduced. Therefore, the width of the black frame 22 shielding the second joint portion 17 can be reduced. Accordingly, the size of an area of the triangular window 30 occupied by the black frame 22 is reduced, which increases the effective view through the triangular window 30.

(2) It is important to provide a large effective view of an occupant on the front side of the automobile 10 than on the rear side. Therefore, the pillar structure of the present embodiment is particularly advantageous when applied to a front portion of the automobile 10.

(3) Since the front outer garnish 21 and the triangular window 30 are integrally molded, no boundary (gap) exists between the front outer garnish 21 and the triangular window 30.

This eliminates wind roar that would be generated by a boundary, improves the appearance, and reduces the aerodynamic drag.

(4) Since the front outer garnish 21 is made of polycarbonate, the fitting projection 23 can be formed in the front outer garnish 21 simultaneously when the front outer garnish 21 and the triangular window 30 are integrally molded. By fitting the projection 23 to the fitting hole 13d of the outer panel 13, the front outer garnish 21 can be temporarily fixed to the front pillar 11 when adhering the front outer garnish 21 to the front pillar 11 by means of the urethane adhesive 34. This structure limits movement of the front outer garnish 21 with respect to the front pillar 11 until the urethane adhesive 34 is cured, allowing adhering process of the front outer garnish 21 to be performed with no difficultly.

(5) Since the front outer garnish 21 is made of polycarbonate, the front outer garnish 21 can be adhered to the front pillar 11 by means of the urethane adhesive 34. Thus, unlike a case where a front outer garnish is formed by coating a metal member with resin, no clip is needed to attach a front outer garnish to a front pillar. Therefore, no space for locating clips needs to be created between the front outer garnish 21 and the outer panel 13. This adds to the flexibility of design of the shape of the outer panel 13. Specifically, the outer panel 13 can have a shape in which the second flange portion 13b is bent toward the outer panel 13, while having the bulging portion 13c for maintaining the strength of the front pillar 11. Thus, according to the present embodiment, the length of the second joint portion 17 that extends toward the triangular window 30 can be shortened to reduce the width of the black frame 22, while maintaining the required strength of the front pillar 11.

The above described embodiment may be modified as follows.

Figure 3:
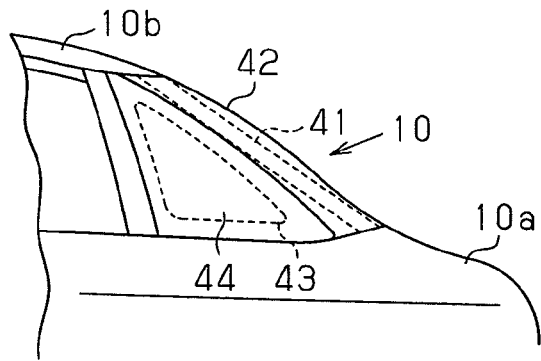
Figure 4:
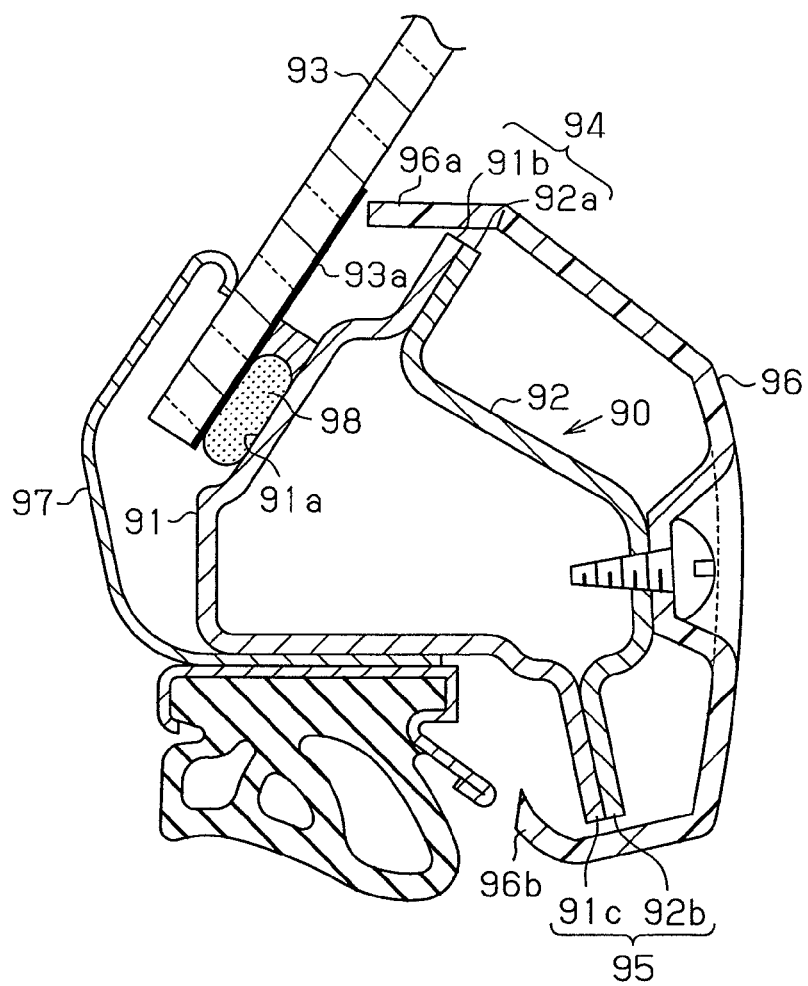

As shown in FIG. 3, the above described pillar structure may be provided in a rear portion of the vehicle body 10a. In this case, a rear outer garnish 42 serving as a cover member covering a rear pillar 41 is provided on the vehicle outer side of the rear pillar 41. A black frame 43 serving as a shielding portion is integrally formed with the rear outer garnish 42. A fixed window 44 is integrally formed with the black frame 43. The fixed window 44 serves as a window transparent portion provided in a rear portion of the vehicle body 10a. Also, the pillar structure may be applied to any part of the vehicle body 10a. For example, the pillar structure may be applied to a quarter window of a rear door.

The fitting projection 23 formed in the front outer garnish 21 may be omitted.

The front outer garnish 21 and the triangular window 30 may be integrally molded by a method other than two-color molding. For example, the front outer garnish 21 and the triangular window 30 may be integrally molded by insert molding.

The materials of the front outer garnish 21 and the triangular window 30 may be arbitrarily changed. For example, the front outer garnish 21 may be made of ABS resin, and the triangular window 30 may be formed of a transparent material such as acrylic resin.

The second joint portion 17 of the front pillar 11 may be bent toward the vehicle inner side, or toward the inner panel 14.

The reinforcement 15 in the front pillar 11 may be omitted. In this case, the first flange portions 13a, 14a are joined directly to each other, and the second flange portions 13b, 14b are joined directly to each other.

The invention claimed is:

1. A pillar structure of a vehicle, comprising:
   a pillar having an outer panel located on a vehicle outer side and an inner panel located on a vehicle inner side, wherein the outer panel and the inner panel each have a flange portion, the flange portion of the outer panel and the flange portion of the inner panel are joined to each other so as to form a joint portion;
   a cover member that is attached to the pillar so as to cover the outer panel from the vehicle outer side;
   a window transparent portion supported by the pillar; and
   a shielding portion that shields the joint portion from the vehicle outer side, thereby making invisible the joint portion from the outside of the vehicle through the window transparent portion,
   wherein the cover member and the window transparent portion are integrally molded of a synthetic resin material, and the shielding portion is integrated with the cover member, and
   wherein the joint portion is bent toward the inner panel or the outer panel.

2. The pillar structure according to claim 1, wherein the joint portion is arranged to be nonparallel to the window transparent portion, such that a width of the joint portion along a direction parallel to the window transparent portion is reduced.

3. The pillar structure according to claim 1, wherein the pillar further includes a reinforcement located between the outer panel and the inner panel.

4. The pillar structure according to claim 1, wherein the cover member is adhered to the pillar, and a fitting projection to be fitted to the pillar is integrally formed with the cover member.

5. The pillar structure according to claim 4, wherein the cover member is a front outer garnish attached to a front pillar of the vehicle,
   wherein the window transparent portion is a front corner window located in a front portion of a side of the vehicle.

6. The pillar structure according to claim 4, wherein the cover member is a rear outer garnish attached to a rear pillar of the vehicle,
   wherein the window transparent portion is a fixed window located in a rear portion of a side of the vehicle.

* * * * *